(12) United States Patent
Park

(10) Patent No.: US 8,411,077 B2
(45) Date of Patent: Apr. 2, 2013

(54) DC-DC CONVERTER AND ORGANIC LIGHT EMITTING DISPLAY DEVICE USING THE SAME

(75) Inventor: Sung-Cheon Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 217 days.

(21) Appl. No.: 12/870,768

(22) Filed: Aug. 27, 2010

(65) Prior Publication Data

US 2011/0115777 A1 May 19, 2011

(30) Foreign Application Priority Data

Nov. 17, 2009 (KR) .................. 10-2009-0110783

(51) Int. Cl.
*G06F 3/038* (2006.01)
*G06F 3/041* (2006.01)
(52) U.S. Cl. ........................ 345/212; 345/178
(58) Field of Classification Search ........... 345/211, 345/212, 214, 173, 178, 179
See application file for complete search history.

(56) References Cited

U.S. PATENT DOCUMENTS

2007/0091036 A1* 4/2007 Han et al. ............... 345/82
2009/0085901 A1* 4/2009 Antony ................. 345/211

FOREIGN PATENT DOCUMENTS

| JP | 2005-122076 | 5/2005 |
| JP | 2006-276713 | 10/2006 |
| KR | 10-2001-0110839 | 12/2001 |
| KR | 10-2002-0016398 | 3/2002 |
| KR | 10-0833764 B1 | 5/2008 |
| KR | 10-2009-0021742 A | 3/2009 |

OTHER PUBLICATIONS

KIPO Office Action dated Aug. 31, 2011 for KR Application No. 10-2009-0110783 (1 page).

* cited by examiner

*Primary Examiner* — Michael Faragalla
(74) *Attorney, Agent, or Firm* — Christie, Parker & Hale, LLP

(57) ABSTRACT

A DC-DC converter having low power consumption by reducing an input current and an organic light emitting display using the same. In one embodiment, a DC-DC converter includes a buck-boost circuit for generating and outputting a second power of a second power source by receiving an input voltage. The buck-boost circuit adjusts and outputs the voltage level of the second power of the second power source in response to the voltage level of the input voltage. A controller controls the buck-boost circuit. The buck-boost circuit includes a first coil coupled between a first node and a ground; a first capacitor having first and second electrodes, the first electrode being coupled to the first node, a first switch coupled between the first node and an input terminal; and a second switch coupled between the second electrode of the capacitor and ground.

11 Claims, 2 Drawing Sheets

DC-DC CONVERTER AND ORGANIC LIGHT EMITTING DISPLAY DEVICE USING THE SAME

CROSS-REFERENCE TO RELATED APPLICATION

This application claims priority to and the benefit of Korean Patent Application No. 10-2009-0110783, filed on Nov. 17, 2009, in the Korean Intellectual Property Office, the entire content of which is incorporated herein by reference.

BACKGROUND

1. Field

One or more aspects of the present invention relate to a DC-DC converter and an organic light emitting display device using the same.

2. Description of Related Art

Various types of flat panel display devices which may have less weight and volume than cathode ray tubes have recently been developed. The types of flat panel display devices include a liquid crystal display device, a field emission display device, a plasma display panel, an organic light emitting display device, and the like.

Among the flat panel display devices, the organic light emitting display device displays images using an organic light emitting diode (OLED) which produces light with a luminance corresponding to an amount of current inputted (or supplied) to the OLED.

The organic light emitting display device has various characteristics such as excellent color reproduction, thin and lightweight devices, and the like. Accordingly, the organic light emitting device has been used in fields such as mobile phones, PDAs, MP3 players, and the like.

SUMMARY

Aspects of embodiments of the present invention are directed toward a DC-DC converter which has low power requirements and a small size by reducing the amplitude of input current and an organic light emitting display device using the DC-DC converter.

According to an embodiment of the present invention, there is provided a DC-DC converter including a buck-boost circuit for generating and outputting a second power of a second power source using an input voltage, the buck-boost circuit being configured to adjust and output the voltage level of the second power of the second power source in accordance with the voltage level of the input voltage; and a controller for controlling the buck-boost circuit, wherein the buck-boost circuit includes a first coil coupled between a first node and a ground; a first capacitor having first and second electrodes, the first electrode being coupled to the first node; a first switch coupled between the first node and an input terminal; a second switch coupled between the second electrode of the first capacitor and the ground; and a third switch coupled between the second electrode of the first capacitor and a first output terminal.

Another embodiment of the present invention provides an organic light emitting display device including a display unit for displaying an image in response to a data signal, a scan signal, a first power of a first power source, and a second power of a second power source; a data driver for generating and outputting the data signal; a scan driver for generating and outputting the scan signal; a DC-DC converter for generating and outputting the first power of the first power source and the second power of the second power source; and a controller for outputting a control signal to control the DC-DC converter, wherein the DC-DC converter includes: a buck-boost circuit for generating and outputting the second power of the second power source using an input voltage, the buck-boost circuit configured to adjust and output the voltage level of the second power source in accordance with a voltage level of the input voltage; and a controller for controlling the boost circuit and the buck-boost circuit, wherein the buck-boost circuit includes a first coil coupled between a first node and a ground; a first capacitor having first and second electrodes, the first electrode being coupled to the first node; a first switch coupled between the first node and an input terminal; a second switch coupled between the second electrode of the first capacitor and the ground; and a third switch coupled between the second electrode of the first capacitor and a first output terminal.

In a DC-DC converter and an organic light emitting display device using the same according to embodiments of the present invention, the peak value of current is decreased, thereby increasing the efficiency of a buck-boost circuit. Further, a coil with low inductance is used in the buck-boost circuit, thereby reducing the size of the DC-DC converter.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
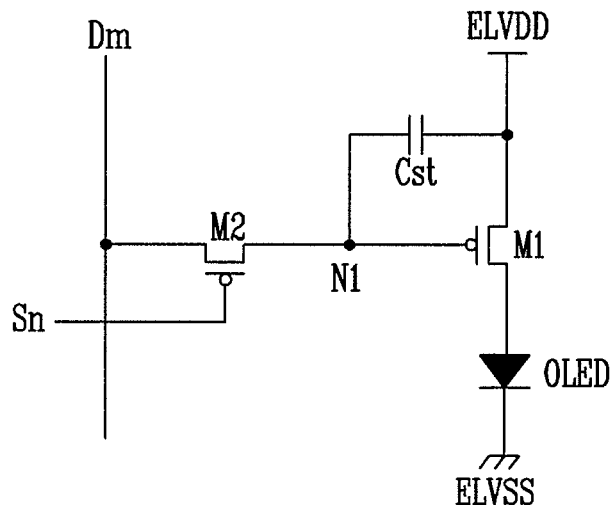
FIG. 1 is a circuit diagram of a pixel used in an organic light emitting display device.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

FIG. 1 is a circuit diagram of a pixel used in a general organic light emitting display device.

Referring to FIG. 1, the pixel includes a first transistor M1, a second transistor M2, a capacitor Cst, and an organic light emitting diode (OLED).

The first transistor M1 has a source electrode coupled to a first power source ELVDD, a drain electrode coupled to an anode electrode of the OLED, and a gate electrode coupled to a first node N1. The second transistor M2 has a source electrode coupled to a data line Dm, a drain electrode coupled to the first node N1, and a gate electrode coupled to a scan line Sn. The capacitor Cst has a first electrode coupled to the source electrode of the first transistor M1 and a second electrode coupled to the first node N1. The OLED has an anode electrode coupled to the drain electrode of the first transistor M1 and a cathode electrode coupled to a second power source ELVSS.

In the pixel configured as described above, the voltage at the first node N1 is determined in response to the data signal supplied through the data line Dm. The first transistor M1 allows (or controls) current to flow from the first power source ELVDD through the OLED to the second power source ELVSS based on the voltage at the first node N1. Through such an operation, the OLED emits light with a luminance corresponding to the current flowing through it.

The first power source ELVDD and the second power source ELVSS are generated by a boost circuit and a buck-boost circuit, respectively.

The amount of current inputted to the buck-boost circuit is much larger than the current inputted to the boost circuit. Therefore, the buck-boost circuit is less efficient than the boost circuit. Since the current inputted to the buck-boost circuit is greater than that inputted to the boost circuit, the inductance of a coil provided to the buck-boost circuit is necessarily greater than that provided to the boost circuit. Therefore, there is a limitation in reducing the size of the buck-boost circuit.

Figure 2:
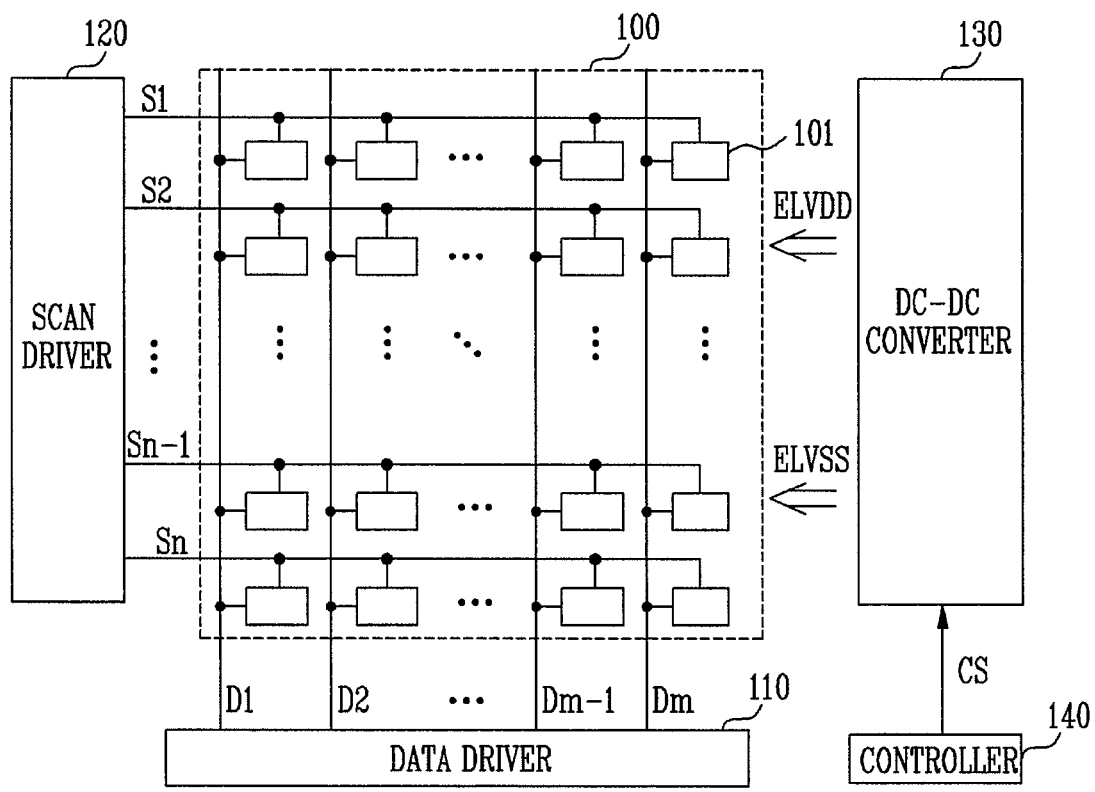
FIG. 2 is a block diagram illustrating the structure of an organic light emitting display device according to an embodiment of the present invention.

FIG. 2 is a block diagram illustrating the structure of an organic light emitting display device according to an embodiment of the present invention.

Referring to FIG. 2, the organic light emitting display device of this embodiment includes a display unit (or pixel unit or display region) 100, a data driver 110, a scan driver 120, a DC-DC converter 130 and a controller 140.

The display unit 100 includes a plurality of pixels 101 and each of the pixels 101 includes an organic light emitting diode (OLED) that emits light in response to the flow of current. The display unit 100 further includes a plurality of scan lines S1, S2, . . . , Sn-1, and Sn arranged in rows to supply scan signals and a plurality of data lines D1, D2, . . . , Dm-1, and Dm arranged in columns to supply data signals. The display unit 100 receives a first power of a first power source ELVDD and a second power of a second power source ELVSS supplied from the exterior thereof (or an external source).

The data driver 110 receives an image signal having components of red, green and blue to generate a data signal. The data driver 110 is coupled to the data lines D1, D2, . . . , Dm-1, and Dm of the display unit 100 to supply the generated data signal to the display unit 100.

The scan driver 120 supplies scan signals to specific rows of the display unit 100. The scan driver 120 is coupled to the scan lines S1, S2, . . . , Sn-1, and Sn to supply the generated scan signal to the display unit 100. The data signals outputted from data driver 110 are supplied to pixels 101 to which the scan signals are supplied from the scan driver 120, so that a driving current generated in each of the pixels 101 flows into the corresponding organic light emitting diode.

The DC-DC converter 130 supplies the first power of the first power source ELVDD and the second power of the second power source ELVSS to the display unit 100. The DC-DC converter 130 generates the first power of the first power source ELVDD and the second power of the second power source ELVSS by boosting or inverting a voltage inputted from the exterior thereof (or an external source). In embodiments of the present invention, the peak value of current inputted to the DC-DC converter 130 is reduced, thereby reducing power consumption. Accordingly, the efficiency of the DC-DC converter is increased (or improved).

The controller 140 generates a control signal CS to control the DC-DC converter 130 such that the efficiency of the DC-DC converter 130 is increased. Particularly, it is possible to decrease the peak value of current inputted when the second power source ELVSS is generated.

Figure 3:
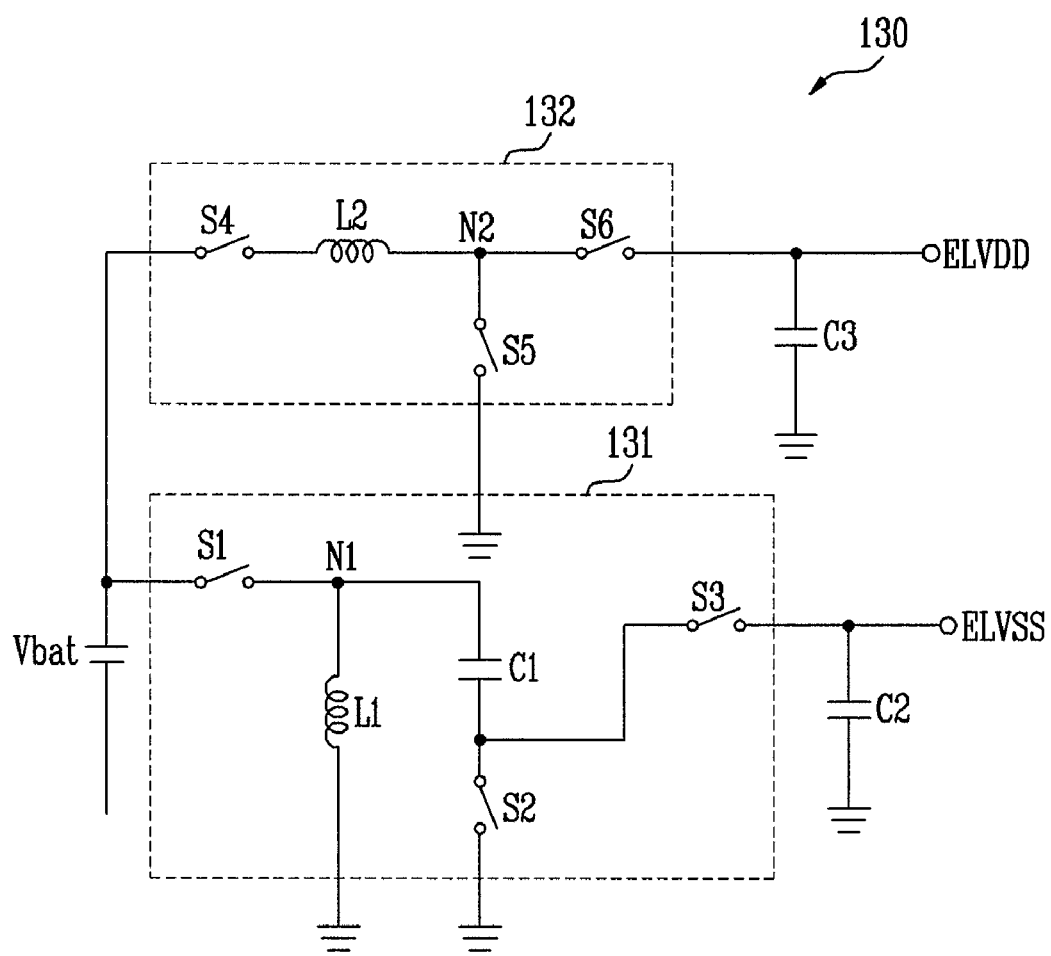
FIG. 3 is a circuit diagram illustrating a structure of a DC-DC converter, according to one embodiment of the present invention, which may be used in the organic light emitting display device of FIG. 2.

FIG. 3 is a circuit diagram illustrating the structure of the DC-DC converter used in the organic light emitting display device of FIG. 2.

Referring to FIG. 3, the DC-DC converter 130 includes a buck-boost circuit 131 and a boost circuit 132.

The buck-boost circuit 131 of one embodiment of the present invention includes a first coil L1, a first capacitor C1, a first switch S1, a second switch S2 and a third switch S3. The buck-boost circuit 131 generates a second power of a second power source ELVSS by inverting an input voltage Vbat. Generally, a buck-boost circuit generates the second power of the second power source ELVSS by applying an electromotive force generated by current flowing through the first coil L1. However, if the current flowing through the first coil L1 is increased by the input voltage Vbat, the efficiency of the buck-boost circuit is decreased due to the increase of power consumption (or increased current). In order to mitigate such a problem, the buck-boost circuit 131 according to one embodiment further includes the first capacitor C1 coupled in parallel with the first coil L1.

The operation of the buck-boost circuit 131 configured as described above will be described. When the first and second switches S1 and S2 are in an 'on' state and the third switch S3 is in an 'off' state, current flows through the first coil L1. At this time, the first capacitor C1 is coupled in parallel with the first coil L1, and hence current is inputted (or flows) to the first coil L1 and the first capacitor C1. Here, the current flows through the first coil to thereby generate an electromotive force.

When the first and second switches S1 and S2 are in an 'off' state and the third switch S3 is in an 'on' state, the current flowing from an output terminal and the current charged in the first capacitor C1 flow through the first coil L1 to ground.

Thus, the first capacitor C1 slows (or reduces) the current flowing through the first coil L1, thereby decreasing the peak value of the current flowing through the first coil L1. Accordingly, power consumption is reduced, thereby increasing the efficiency of the buck-boost circuit 131.

The boost circuit 132 includes a second coil L2, a fourth switch S4, a fifth switch S5 and a sixth switch S6. The boost circuit 132 generates a first power at a first power source ELVDD by boosting an input voltage Vbat. In the boost circuit 132, when the fourth and fifth switches S4 and S5 are in an 'on' state and the sixth switch S6 is in an 'off' state, current flows through the second coil L2. When the fourth switch S4 remains in the 'on' state and the fifth switch is in an 'off' state while the sixth switch S6 remains in the 'off' state, an electromotive force is generated at the second coil L2 so as to maintain the state in which current can flow through the second coil L2. Then, when the sixth switch S6 is in an 'on' state, the electromotive force generated at the second coil L2 is applied to an output terminal, so that the first power of the first power source ELVDD is outputted to the output terminal.

The first to third switches S1 to S3 of the buck-boost circuit 131 and the fourth to sixth switches S4 to S6 receive a control signal CS supplied from the controller 140 and perform switching operations, so that the second power of the second power source ELVSS and the first power of the first power source ELVDD can be generated by the buck-boost circuit 131 and the boost circuit 132, respectively.

A second capacitor C2 and a third capacitor C3 are respectively coupled to the output terminals of the buck-boost circuit 131 and the boost circuit 132 so that the second power source ELVSS and the first power source ELVDD can be stably outputted from the buck-boost circuit 131 and the boost circuit 132, respectively.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A DC-DC converter comprising:
a buck-boost circuit for generating and outputting a second power of a second power source using an input voltage, the buck-boost circuit being configured to adjust and output the voltage level of the second power of the second power source in accordance with the voltage level of the input voltage;
a boost circuit for generating and outputting a first power by boosting the input voltage; and
a controller configured to control the boost circuit and the buck-boost circuit,
wherein the buck-boost circuit comprises a first coil coupled between a first node and a ground; a first capacitor having first and second electrodes, the first electrode being coupled to the first node; a first switch coupled between the first node and an input terminal; a second switch coupled between the second electrode of the first capacitor and the ground; and a third switch coupled between the second electrode of the first capacitor and a first output terminal.

2. The DC-DC converter according to claim 1, wherein the buck-boost circuit further comprises a second capacitor coupled to the first output terminal.

3. The DC-DC converter according to claim 1, wherein the boost circuit comprises a second coil coupled between a second node and the input terminal; a fourth switch coupled between the second coil and the input terminal; a fifth switch coupled between the second node and the ground; and a sixth switch coupled between the second node and a second output terminal.

4. The DC-DC converter according to claim 3, wherein the boost circuit further comprises a third capacitor coupled to the second output terminal.

5. An organic light emitting display device comprising:
a display unit for displaying an image in response to a data signal, a scan signal, a first power of a first power source and a second power of a second power source;
a data driver for generating and outputting the data signal;
a scan driver for generating and outputting the scan signal;
a DC-DC converter for generating and outputting the first power of the first power source and the second power of the second power source; and
a controller for outputting a control signal to control the DC-DC converter,
wherein the DC-DC converter comprises:
a buck-boost circuit for generating and outputting the second power of the second power source by utilizing an input voltage, the buck-boost circuit being configured to adjust and output the voltage level of the second power source in accordance with a voltage level of the input voltage;
a boost circuit for generating and outputting the first power by boosting the input voltage; and
a controller configured to control the buck-boost circuit,
wherein the buck-boost circuit comprises a first coil coupled between a first node and a ground; a first capacitor having first and second electrodes, the first electrode being coupled to the first node; a first switch coupled between the first node and an input terminal; a second switch coupled between the second electrode of the first capacitor and the ground; and a third switch coupled between the second electrode of the first capacitor and a first output terminal.

6. The organic light emitting display according to claim 5, wherein the buck-boost circuit further comprises a second capacitor coupled to the first output terminal.

7. The organic light emitting display device according to claim 5, wherein the boost circuit comprises a second coil coupled between a second node and the input terminal; a fourth switch coupled between the second coil and the input terminal; a fifth switch coupled between the second node and the ground; and a sixth switch coupled between the second node and a second output terminal.

8. The organic light emitting display device according to claim 7, wherein the boost circuit further comprises a third capacitor coupled to the second output terminal.

9. The organic light emitting display device according to claim 5, wherein the controller is configured to repeatedly control the first, second, and third switches to alternate between a first and second mode,
wherein, in the first mode, the first and second switches are in an 'on' state and the third switch is in an 'off' state, and
wherein, in the second mode, the first and second switches are in an 'off' state and the third switch is in an 'on' state.

10. A DC-DC converter comprising:
a buck-boost circuit for generating and outputting a power of a power source using an input voltage, the buck-boost circuit being configured to adjust and output the voltage level of the power of the power source in accordance with the voltage level of the input voltage; and
a controller configured to control the buck-boost circuit,
wherein the buck-boost circuit comprises a first coil coupled between a first node and a ground; a first capacitor having first and second electrodes, the first electrode being coupled to the first node; a first switch coupled between the first node and an input terminal; a second switch coupled between the second electrode of the first capacitor and the ground; and a third switch coupled between the second electrode of the first capacitor and a first output terminal.

11. The DC-DC converter of claim 10, wherein the buck-boost circuit further comprises a second capacitor coupled to the first output terminal.

* * * * *